(12) United States Patent
Bertrand et al.

(10) Patent No.: US 11,913,148 B2
(45) Date of Patent: *Feb. 27, 2024

(54) HYBRID REINFORCEMENT FABRIC

(71) Applicant: Owens Corning Intellectual Capital, LLC, Toledo, OH (US)

(72) Inventors: Chloé Bertrand, La Motte Servolex (FR); Richard Veit, Rochefort (FR); Samuel Solarski, La Madeleine (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 411 days.

This patent is subject to a terminal disclaimer.

(21) Appl. No.: 17/266,093

(22) PCT Filed: Aug. 16, 2019

(86) PCT No.: PCT/US2019/046748
§ 371 (c)(1),
(2) Date: Feb. 4, 2021

(87) PCT Pub. No.: WO2020/041106
PCT Pub. Date: Feb. 27, 2020

(65) Prior Publication Data
US 2021/0301433 A1 Sep. 30, 2021

Related U.S. Application Data

(60) Provisional application No. 62/720,398, filed on Aug. 21, 2018.

(51) Int. Cl.
*B32B 5/12* (2006.01)
*D04B 21/16* (2006.01)
*B32B 5/06* (2006.01)

(52) U.S. Cl.
CPC ............ *D04B 21/165* (2013.01); *B32B 5/073* (2021.05); *B32B 5/12* (2013.01); *D10B 2101/06* (2013.01);
(Continued)

(58) Field of Classification Search
None
See application file for complete search history.

(56) References Cited

U.S. PATENT DOCUMENTS

| | | |
|---|---|---|
| 5,591,933 A | 1/1997 | Li et al. |
| 5,795,835 A | 8/1998 | Bruner et al. |

(Continued)

FOREIGN PATENT DOCUMENTS

| | | |
|---|---|---|
| CN | 201428038 Y | 3/2010 |
| CN | 101516612 B | 9/2012 |

(Continued)

OTHER PUBLICATIONS

Office Action from Indian Application No. 202137010649 dated Aug. 5, 2022.

(Continued)

*Primary Examiner* — Alexander S Thomas
(74) *Attorney, Agent, or Firm* — Calfee, Halter & Griswold LLP

(57) ABSTRACT

A hybrid reinforcing fabric includes glass fibers and carbon fibers. The hybrid reinforcing fabric can be readily infused at an acceptable infusion speed, without requiring that the carbon fiber tows used resin. Thus, the fabric provides for an effective one-step (i.e., in the mold) infusion process during composite part formation.

17 Claims, 12 Drawing Sheets

(52) U.S. Cl.
CPC ...... *D10B 2101/12* (2013.01); *D10B 2331/04* (2013.01); *D10B 2403/02412* (2013.01); *D10B 2505/02* (2013.01)

(56) References Cited

U.S. PATENT DOCUMENTS

| | | | |
|---|---|---|---|
| 5,809,805 | A | 9/1998 | Palmer et al. |
| 6,139,942 | A | 10/2000 | Hartness et al. |
| 6,599,610 | B2 | 7/2003 | Homma et al. |
| 7,168,272 | B2 | 1/2007 | Dunn |
| 7,431,980 | B2 | 10/2008 | Woodman et al. |
| 7,431,981 | B2 | 10/2008 | Schneider |
| 7,726,253 | B2 | 6/2010 | Lilleheden et al. |
| 7,758,313 | B2 | 7/2010 | Eyb |
| 7,930,907 | B2 | 4/2011 | Dunn et al. |
| 8,234,990 | B2 | 8/2012 | Xie et al. |
| 8,236,410 | B2 | 8/2012 | Shinoda et al. |
| 8,298,656 | B2 | 10/2012 | Schneider |
| 8,613,257 | B2 | 12/2013 | Wockatz |
| 9,273,418 | B2 | 1/2016 | Arvidson et al. |
| 9,346,943 | B2 | 5/2016 | Hoppe |
| 9,505,193 | B2 | 11/2016 | Bergstrom |
| 9,695,533 | B2 | 7/2017 | Beraud et al. |
| 9,770,844 | B2 | 9/2017 | Moser et al. |
| 9,993,992 | B2 | 6/2018 | Whitledge et al. |
| 10,022,907 | B2 | 7/2018 | Bergstrom et al. |
| 10,035,301 | B2 | 7/2018 | Bergstrom et al. |
| 10,167,583 | B2 | 1/2019 | Witte et al. |
| 10,850,453 | B2 | 12/2020 | Koefoed et al. |
| 2004/0113317 | A1 | 6/2004 | Healey et al. |
| 2009/0162604 | A1* | 6/2009 | Adolphs ........... B32B 5/12 442/310 |
| 2010/0028644 | A1 | 2/2010 | Xie et al. |
| 2011/0293881 | A1 | 12/2011 | Gojny et al. |
| 2013/0280476 | A1 | 10/2013 | Davis et al. |
| 2014/0147620 | A1 | 5/2014 | Li et al. |
| 2015/0004368 | A1 | 1/2015 | Witzke et al. |
| 2015/0030804 | A1 | 1/2015 | Baser |
| 2016/0032519 | A1 | 2/2016 | Li et al. |
| 2017/0067191 | A1 | 3/2017 | Gault et al. |
| 2018/0001594 | A1 | 1/2018 | Baser |
| 2018/0010270 | A1 | 1/2018 | Tan et al. |
| 2018/0272626 | A1 | 9/2018 | Wockatz et al. |
| 2018/0272654 | A1 | 9/2018 | Baser |
| 2018/0281343 | A1 | 10/2018 | Harada et al. |
| 2018/0363178 | A1 | 12/2018 | Koizumi |
| 2019/0240953 | A1 | 8/2019 | Kuroda |
| 2019/0256673 | A1 | 8/2019 | Geli et al. |
| 2020/0002861 | A1 | 1/2020 | de Rovere et al. |
| 2020/0048804 | A1 | 2/2020 | Ferrari |
| 2020/0071865 | A1 | 3/2020 | Ren et al. |
| 2020/0238659 | A1 | 7/2020 | Baser |
| 2021/0008815 | A1 | 1/2021 | Huoponen et al. |
| 2021/0180225 | A1 | 6/2021 | Bertrand et al. |
| 2022/0112637 | A1 | 4/2022 | Bertrand et al. |

FOREIGN PATENT DOCUMENTS

| | | |
|---|---|---|
| CN | 102747532 A | 10/2012 |
| CN | 104652038 A | 5/2015 |
| CN | 105088510 A | 11/2015 |
| CN | 105172263 A | 12/2015 |
| CN | 205009684 U | 2/2016 |
| CN | 107130365 A | 9/2017 |
| CN | 206512387 U | 9/2017 |
| CN | 107225817 A | 10/2017 |
| CN | 107458046 A | 12/2017 |
| CN | 107475899 A | 12/2017 |
| CN | 107974764 A | 5/2018 |
| CN | 108842296 A | 11/2018 |
| CN | 208346403 U | 1/2019 |
| CN | 110042568 A | 7/2019 |
| CN | 110067080 A | 7/2019 |
| DE | 19913647 A1 | 9/2000 |
| DE | 202010003638 U1 | 8/2010 |
| DE | 102012101724 A1 | 9/2013 |
| DE | 102012015448 A1 | 2/2014 |
| DE | 102013223836 A1 | 5/2015 |
| DE | 102014201099 A1 | 7/2015 |
| DE | 102015210735 A1 | 12/2016 |
| EP | 2657385 A1 | 10/2013 |
| EP | 2769833 A1 | 8/2014 |
| FR | 2890398 A1 | 3/2007 |
| WO | 9417229 A1 | 8/1994 |
| WO | 9965433 A1 | 12/1999 |
| WO | 2005032804 A1 | 4/2005 |
| WO | 2009142315 A1 | 11/2009 |
| WO | 2013093053 A2 | 6/2013 |
| WO | 2013160596 A1 | 10/2013 |
| WO | 2014009314 A1 | 1/2014 |
| WO | 2018187186 A1 | 10/2018 |
| WO | 2019117029 A1 | 6/2019 |

OTHER PUBLICATIONS

Office Action from Indian Application No. 202137010640 dated Oct. 13, 2022.
International Search Report and Written Opinion from PCT/US2019/046742 dated Oct. 31, 2019.
International Search Report and Written Opinion from PCT/US2019/046748 dated Nov. 19, 2019.
International Search Report and Written Opinion from PCT/US2019/046751 dated Nov. 19, 2019.
Iyer, "Directionally-oriented inlay warp knits—Some aspects of production and application," Indian Journal of Research, vol. 19, Sep. 1, 2014, pp. 195-202.
Vallons et al., "The influence of the stitching pattern on the internal geometry, quasi-static and fatigue mechanical properties of glass fibre non-crimp fabric composites," Composites Part A: Applied Science and Manufacturing, vol. 56, Jan. 1, 2014, pp. 272-279.
Office Action from Chinese Application No. 201980054758.4 dated Apr. 8, 2022.
Office Action from Chinese Application No. 201980060150.2 dated Apr. 13, 2022.
Office Action from Chinese Application No. 201980060152.1 dated Apr. 25, 2022.
Office Action from Chinese Application No. 201980054758.4 dated Jan. 3, 2023.
Office Action from Chinese Application No. 201980060152.1 dated Jan. 28, 2023.
Office Action from Chinese Application No. 201980054758.4 dated Oct. 8, 2022.
Office Action from European Application No. 19762031.3 dated Dec. 8, 2022.
Office Action from European Application No. 19762033.9 dated Dec. 8, 2022.
Office Action from European Application No. 19762030.5 dated Dec. 6, 2022.
Office Action from Indian Application No. 202137006241 dated Nov. 21, 2022.
Office Action from Chinese Application No. 201980060150.2 dated Nov. 1, 2022.
Jia Lijun et al., "Composite Material Processing Technology," 2007, p. 127.
Office Action from Brazilian Application No. BR112021003190-1 dated Apr. 26, 2023.
Office Action from Brazilian Application No. BR112021003187-1 dated Apr. 26, 2023.
Office Action from Chinese Application No. 201980060150.2 dated Mar. 30, 2023.
Office Action from Brazilian Application No. BR112021003184-7 dated May 16, 2023.
Notice of Allowance from U.S. Appl. No. 17/268,697 dated May 31, 2023.
Office Action from U.S. Appl. No. 17/268,688 dated Aug. 29, 2023.
Office Action from European Application No. 19762033.9 dated Sep. 26, 2023.

(56) References Cited

OTHER PUBLICATIONS

Office Action from Mexican Application No. MX/a/2021/001955 dated Oct. 26, 2023.
Office Action from Mexican Application No. MX/a/2021/001963 dated Oct. 27, 2023.

* cited by examiner

DETAIL A

DETAIL B

DETAIL C

HYBRID REINFORCEMENT FABRIC

CROSS-REFERENCE TO RELATED APPLICATIONS

This application is the U.S. national stage entry of PCT/US2019/046748, filed on Aug. 16, 2019, which claims priority to and any benefit of U.S. Provisional Patent Application No. 62/720,398, filed Aug. 21, 2018, the entire contents of which are incorporated herein by reference.

FIELD

The inventive concepts relate generally to fibrous reinforcement materials and, more particularly, to a hybrid fabric including glass fibers and carbon fibers.

BACKGROUND

It is known to use glass fibers to reinforce structural components, such as wind turbine blades. It is likewise known to use carbon fibers to reinforce structural components, such as wind turbine blades. These structural components are often formed by hand laying a collection of the fibers (e.g., in the form of a fabric) into a mold, filling the mold with a resin, and curing the resin to form the part.

Glass fiber reinforcement materials exhibit good mechanical properties, including strength, strain, and compression; are relatively inexpensive; and are readily infused with a resin. However, the elastic modulus of the glass fiber reinforcement materials is low, which can present design limitations.

Carbon fiber reinforcement materials exhibit good mechanical properties, including stiffness and tensile strength, at a low density. However, the carbon fiber reinforcement materials are low in strain, low in compressive strength, and relatively expensive. Furthermore, the carbon fiber reinforcement materials can be difficult to infuse with a resin.

It would be desirable to combine glass fibers and carbon fibers into a hybrid reinforcement material for use in reinforcing structural components, so as to take advantage of each fiber's respective strengths while compensating for each fiber's respective weaknesses. However, when fabrics are made with only carbon tows, the very thin carbon fibers that are bundled together lead to poor infusion speed.

Conventional carbon-containing reinforcement fabrics have attempted to solve this problem by pre-impregnating the carbon tow used to form the fabric. In other words, resin is applied to the carbon fibers prior to the fabric being placed in a mold to form a composite structure. In some instances, the carbon tow is also spread (i.e., the individual carbon fibers separated) to accelerate the rate of infusion of the carbon tow. Such a "prepreg" fabric can introduce processing, storage, and handling difficulties.

In view of the above, there is an unmet need for a hybrid reinforcement fabric including glass fibers and carbon fibers, which can be readily infused with resin at an acceptable infusion speed.

SUMMARY

The invention relates generally to a hybrid reinforcement fabric that includes glass fibers and carbon fibers, a method of producing the hybrid reinforcement fabric, and a composite part formed from the hybrid reinforcement fabric.

In one exemplary embodiment, a hybrid reinforcing fabric is provided. The hybrid reinforcing fabric comprises a plurality of first fibers oriented in a first direction; a plurality of second fibers oriented in the first direction; a plurality of third fibers oriented in a second direction; and a stitching yarn maintaining the first fibers, the second fibers, and the third fibers in their respective orientations. The first fibers glass fibers or carbon fibers. The second fibers are carbon fibers. The third fibers are glass fibers, carbon fibers, or both glass and carbon fibers. The first direction is 0 degrees. The second direction is different from the first direction, wherein the second direction is within the range of 0 degrees to 90 degrees. The first fibers and the second fibers constitute between 91 wt. % and 99.5 wt. % of the fabric. The third fibers constitute between 0.5 wt. % and 9 wt. % of the fabric. In the fabric, the glass fibers constitute between 3 wt. % to 95 wt. % of the fabric, and the carbon fibers constitute between 5 wt. % to 97 wt. % of the fabric.

In one exemplary embodiment, the stitching yarn constitutes less than 3 wt. % of the fabric.

In one exemplary embodiment, the stitching yarn is a polyester yarn.

In one exemplary embodiment, the stitching yarn has a linear mass density within the range of 60 dTex to 250 dTex. In one exemplary embodiment, the stitching yarn has a linear mass density greater than 85 dTex. In one exemplary embodiment, the stitching yarn has a linear mass density greater than 200 dTex. In one exemplary embodiment, the stitching yarn has a linear mass density greater than 225 dTex.

In one exemplary embodiment, the stitching yarn forms a stitching pattern through the fabric, the stitching pattern being a tricot stitching pattern.

In one exemplary embodiment, the stitching yarn forms a stitching pattern through the fabric, the stitching pattern being a symmetric double tricot stitching pattern.

In one exemplary embodiment, the stitching yarn forms a stitching pattern through the fabric, the stitching pattern being an asymmetric double tricot stitching pattern.

In one exemplary embodiment, the stitching yarn forms a stitching pattern through the fabric, the stitching pattern being a symmetric diamant stitching pattern.

In one exemplary embodiment, the stitching yarn forms a stitching pattern through the fabric, the stitching pattern being an asymmetric diamant stitching pattern.

In one exemplary embodiment, the stitching yarn defines a stitching length between 3 mm to 6 mm. In one exemplary embodiment, the stitching yarn defines a stitching length of 5 mm. In one exemplary embodiment, the stitching yarn defines a stitching length of 4 mm.

In one exemplary embodiment, the first fibers are glass fibers and the third fibers are glass fibers, wherein a glass composition of the first fibers differs from a glass composition of the third fibers.

In one exemplary embodiment, the hybrid reinforcing fabric further comprises a plurality of fourth fibers oriented in a third direction, wherein the third fibers are glass fibers and the fourth fibers are glass fibers, and wherein a glass composition of the third fibers is the same as a glass composition of the fourth fibers.

In one exemplary embodiment, an absolute value of the second direction is equal to an absolute value of the third direction.

In one exemplary embodiment, a difference between the first direction and the second direction is greater than or equal to 45 degrees.

In one exemplary embodiment, a difference between the first direction and the second direction is greater than or equal to 80 degrees.

In one exemplary embodiment, a linear mass density of the first fibers is between 600 Tex and 4,800 Tex.

In one exemplary embodiment, the third fibers are glass fibers, wherein a linear mass density of the third fibers is between 68 Tex and 300 Tex.

In one exemplary embodiment, the second fibers are fed from one or more carbon tows having a size in the range of 6K to 50K.

In one exemplary embodiment, an areal weight of the second fibers is between 80 g/m² and 500 g/m².

In one exemplary embodiment, the second fibers constitute 7 wt. % of the fabric, wherein an areal weight of the fabric is 2,500 g/m².

In one exemplary embodiment, the second fibers constitute 15 wt. % of the fabric, wherein an areal weight of the fabric is 1,300 g/m².

In one exemplary embodiment, the second fibers constitute 15 wt. % of the fabric, wherein an areal weight of the fabric is 1,400 g/m².

In one exemplary embodiment, the second fibers constitute 25 wt. % of the fabric, wherein an areal weight of the fabric is 1,300 g/m².

In general, the hybrid reinforcing fabric contains no resin, i.e., none of the fibers forming the fabric are pre-impregnated with a resin.

In one exemplary embodiment, a polyester resin has an infusion rate through a thickness of the hybrid reinforcing fabric (approximately 30 mm) of 9 minutes. In one case, where the fabric had a carbon content of 15%, the infusion rate was 0.41 cm per minute.

In one exemplary embodiment, an epoxy resin has an infusion rate through a thickness of the hybrid reinforcing fabric (approximately 30 mm) of 16 minutes. In one case, where the fabric had a carbon content of 15%, the infusion rate was 0.23 cm per minute.

In one exemplary embodiment, an epoxy resin has an infusion rate through a thickness of the hybrid reinforcing fabric (approximately 30 mm) of 8 minutes. In one case, where the fabric had a carbon content of 7%, the infusion rate was 0.419 cm per minute.

In one exemplary embodiment, an epoxy resin has an infusion rate through the hybrid reinforcing fabric in the first direction of between 0.238 cm per minute and 0.5 cm per minute.

In one exemplary embodiment, a polyester resin has an infusion rate through the hybrid reinforcing fabric in the first direction of 0.73 cm per minute.

In one exemplary embodiment, the fabric has an infusion rate through the fabric in a direction perpendicular to the first direction of 0.3 cm per minute.

In one exemplary embodiment, the fabric is infused with a resin that is cured to form a composite article. In one exemplary embodiment, the article is a wind turbine blade or related component (e.g., spar cap).

Other aspects, advantages, and features of the inventive concepts will become apparent to those skilled in the art from the following detailed description, when read in light of the accompanying drawings.

BRIEF DESCRIPTION OF THE DRAWINGS

For a fuller understanding of the nature and advantages of the inventive concepts, reference should be had to the following detailed description taken in connection with the accompanying drawings, in which:

FIG. 1A is a top plan view of the hybrid reinforcing fabric. FIG. 1B is a bottom plan view of the hybrid reinforcing fabric. FIG. 1C is a detailed view of the circle A in FIG. 1A. FIG. 1D is a detailed view of the circle B in FIG. 1B.

FIG. 2A shows a tricot stitching pattern. FIG. 2B shows an asymmetric double tricot stitching pattern. FIG. 2C shows an asymmetric diamant stitching pattern.

DETAILED DESCRIPTION

Figure 1A:
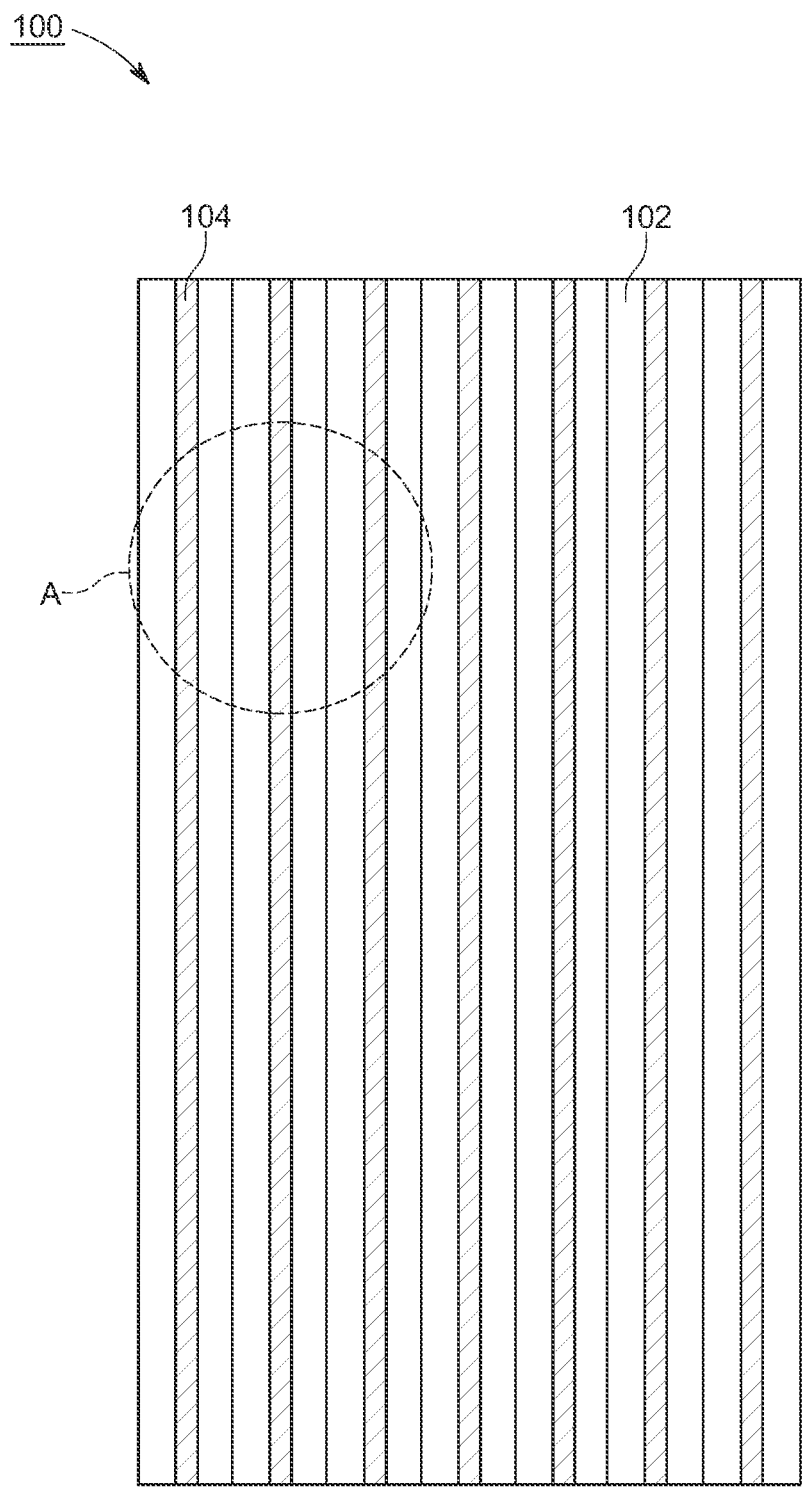
FIGS. 1A-1D illustrate a hybrid reinforcing fabric, according to an exemplary embodiment of the invention.
Figure 1B:
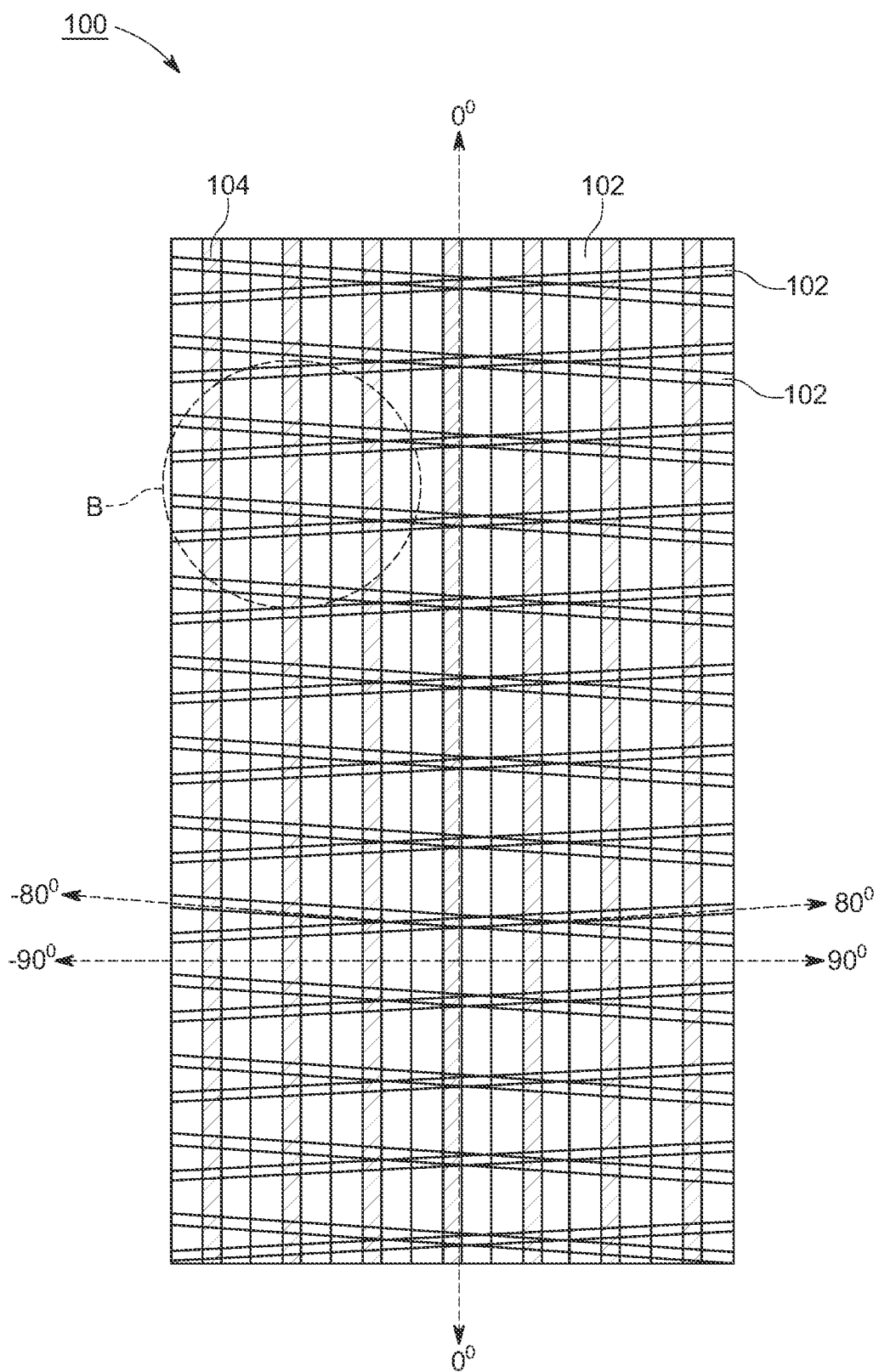

While the inventive concepts are susceptible of embodiment in many different forms, there are shown in the drawings and will be described herein in detail various exemplary embodiments thereof with the understanding that the present disclosure is to be considered as an exemplification of the principles of the inventive concepts. Accordingly, the inventive concepts are not intended to be limited to the specific embodiments illustrated herein.

Unless otherwise defined, the terms used herein have the same meaning as commonly understood by one of ordinary skill in the art encompassing the inventive concepts. The terminology used herein is for describing exemplary embodiments of the inventive concepts only and is not intended to be limiting of the inventive concepts. As used in the description of the inventive concepts and the appended claims, the singular forms "a," "an," and "the" are intended to include the plural forms as well, unless the context clearly indicates otherwise. Furthermore, the term "between" when defining a range is intended to be inclusive of the specified end points as well, unless the context clearly indicates to the contrary.

It has been discovered that by controlling one or more specific product variables including, but not necessarily limited to, glass content, carbon content, glass-carbon ratio, stitching yarn composition, stitching pattern, and stitching length, a hybrid reinforcement fabric made up primarily of glass fibers and carbon fibers can be produced that is an effective reinforcement for structural components (e.g., wind turbine blades) and that exhibits an acceptable rate of infusion.

Accordingly, the inventive concepts provide a hybrid reinforcement fabric comprising glass fibers and carbon fibers. The hybrid reinforcement fabric can be readily infused at an acceptable infusion speed, without requiring that the carbon fiber tows used to form the hybrid reinforcement fabric be spread or pre-impregnated with resin. Thus, the inventive fabric provides for an effective one-step (i.e., in the mold) infusion process during composite part formation. The inventive concepts also encompass a method of producing the hybrid reinforcing fabric. The inventive concepts also encompass a composite part formed from the hybrid reinforcing fabric.

In an exemplary embodiment of the invention, a hybrid reinforcement fabric 100 is constructed from both glass reinforcing fibers 102 and carbon reinforcing fibers 104, as shown in FIGS. 1A-1D.

Any suitable glass reinforcing fibers 102 can be used in the hybrid reinforcement fabric 100. For example, fibers made from E glass, H glass, S glass, an AR glass types can be used. In some exemplary embodiments, basalt fibers can be used in place of some or all of the glass reinforcing fibers 102. In general, the glass reinforcing fibers 102 have a diameter within the range of 13 µm to 24 µm. Typically, the glass reinforcing fibers 102 in the hybrid reinforcement fabric 100 are glass fiber strands 102 (fed from one or more glass rovings) made up of many individual continuous glass filaments.

Any suitable carbon reinforcing fibers 104 can be used in the hybrid reinforcement fabric 100. In general, the carbon reinforcing fibers 104 have a diameter within the range of 5 µm to 11 µm. Typically, the carbon reinforcing fibers 104 in the hybrid reinforcement fabric 100 are carbon fiber strands 104 (fed from one or more carbon tows) made up of many individual continuous carbon filaments.

The hybrid reinforcement fabric 100 is a non-crimp fabric, wherein the fibers 102, 104 are arranged in their respective positions/orientations and then held together by a stitching yarn 106. In some embodiments, the stitching yarn 106 is made of polyester. In some embodiments, the stitching yarn 106 has a linear mass density between 60 dTex and 250 dTex.

Figure 1C:
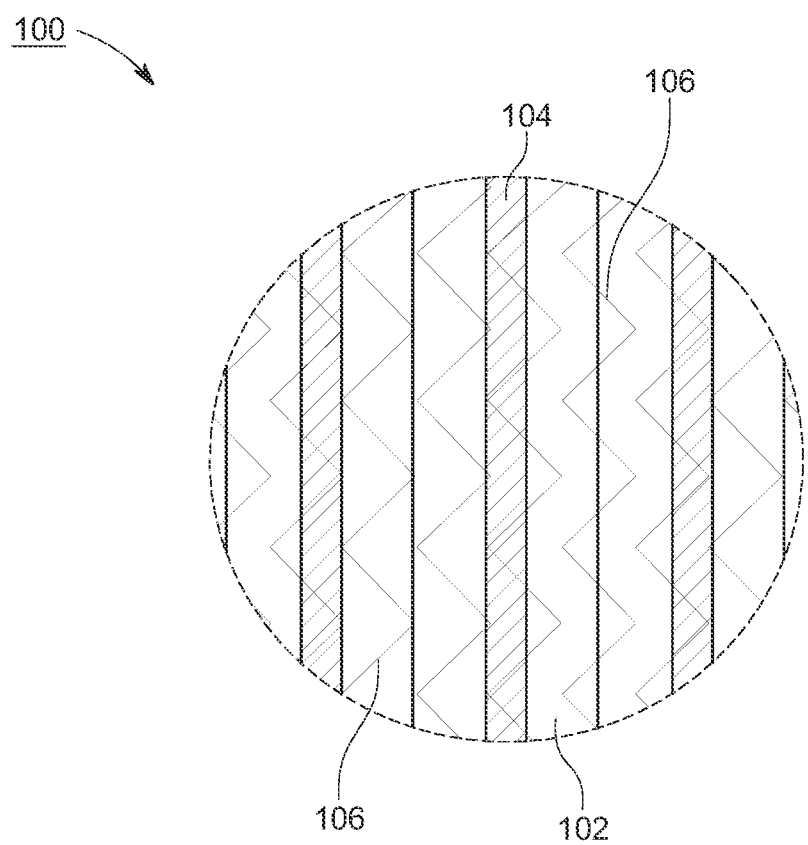
Figure 1D:
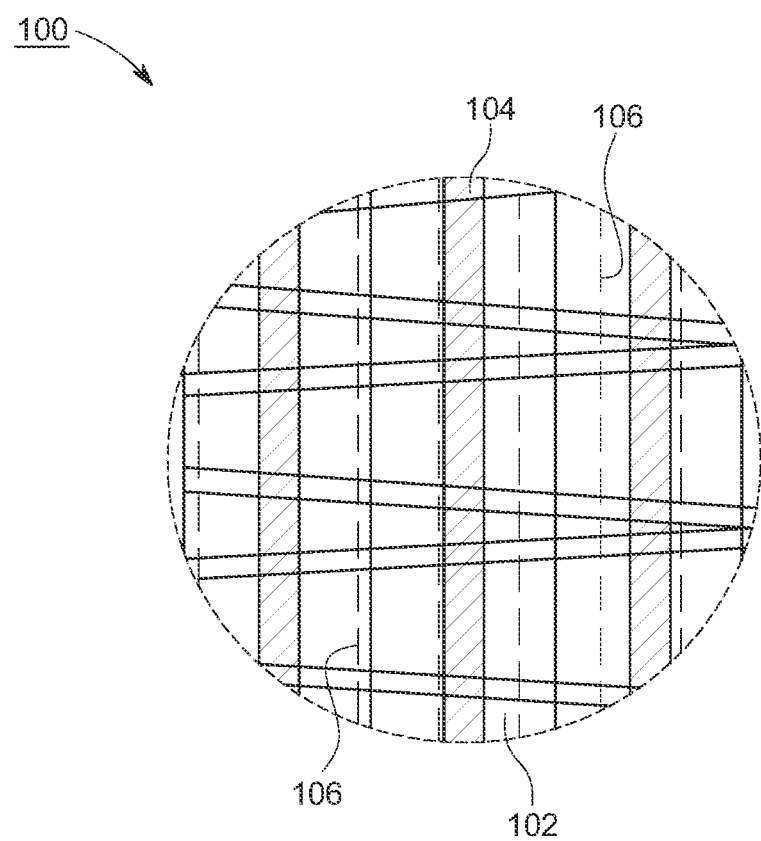
Figure 2A:
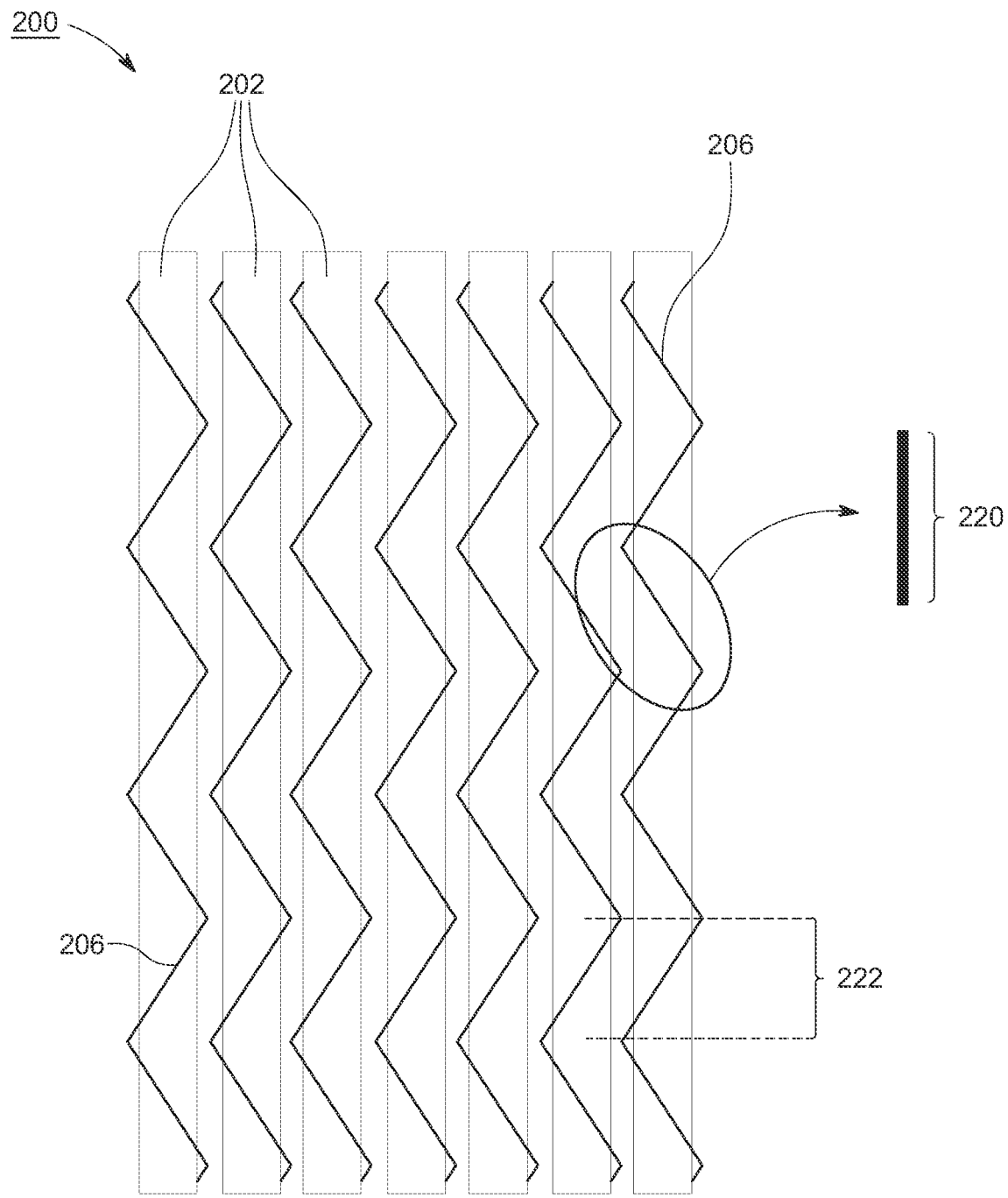
FIGS. 2A-2C illustrate stitching patterns that can be used in the hybrid reinforcing fabric of FIG. 1.
Figure 2B:
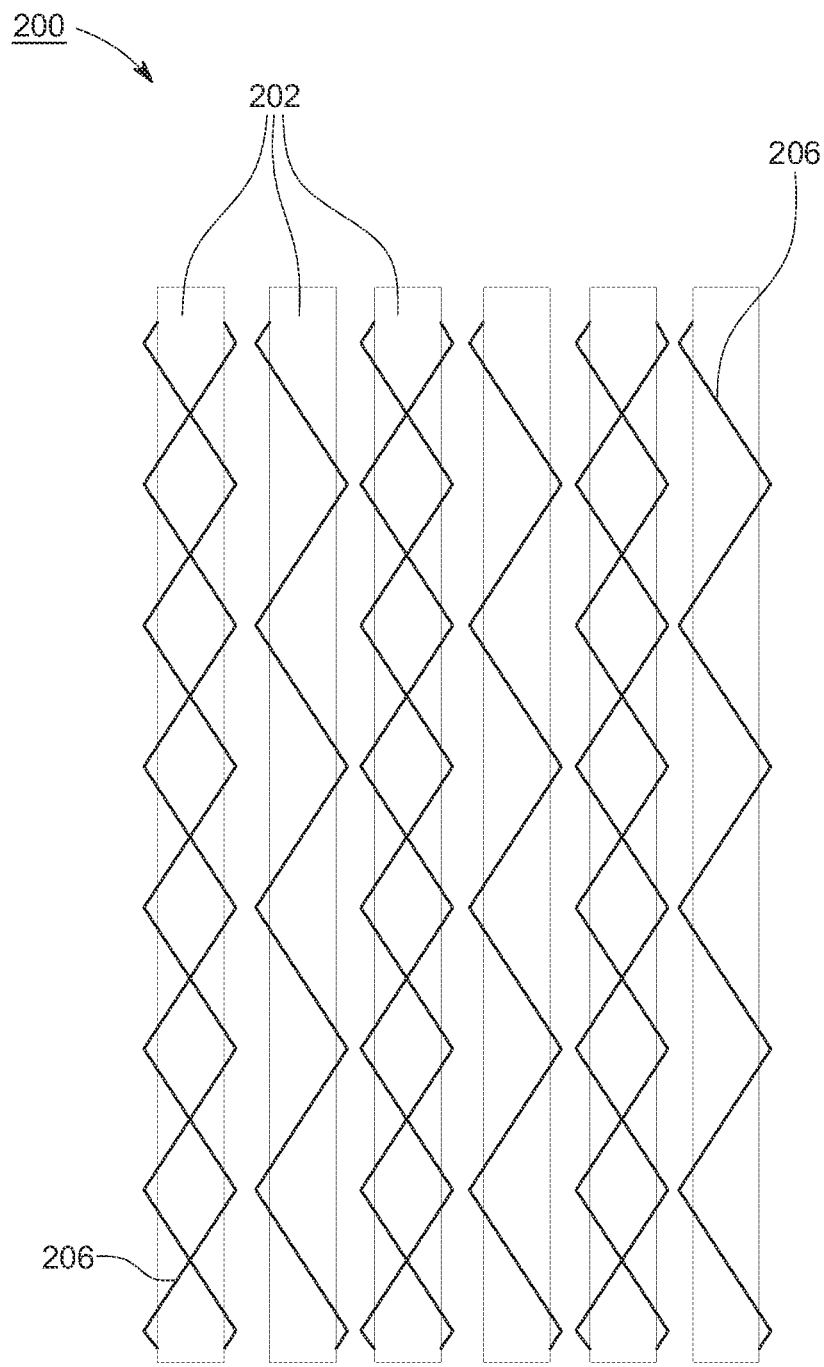
Figure 2C:
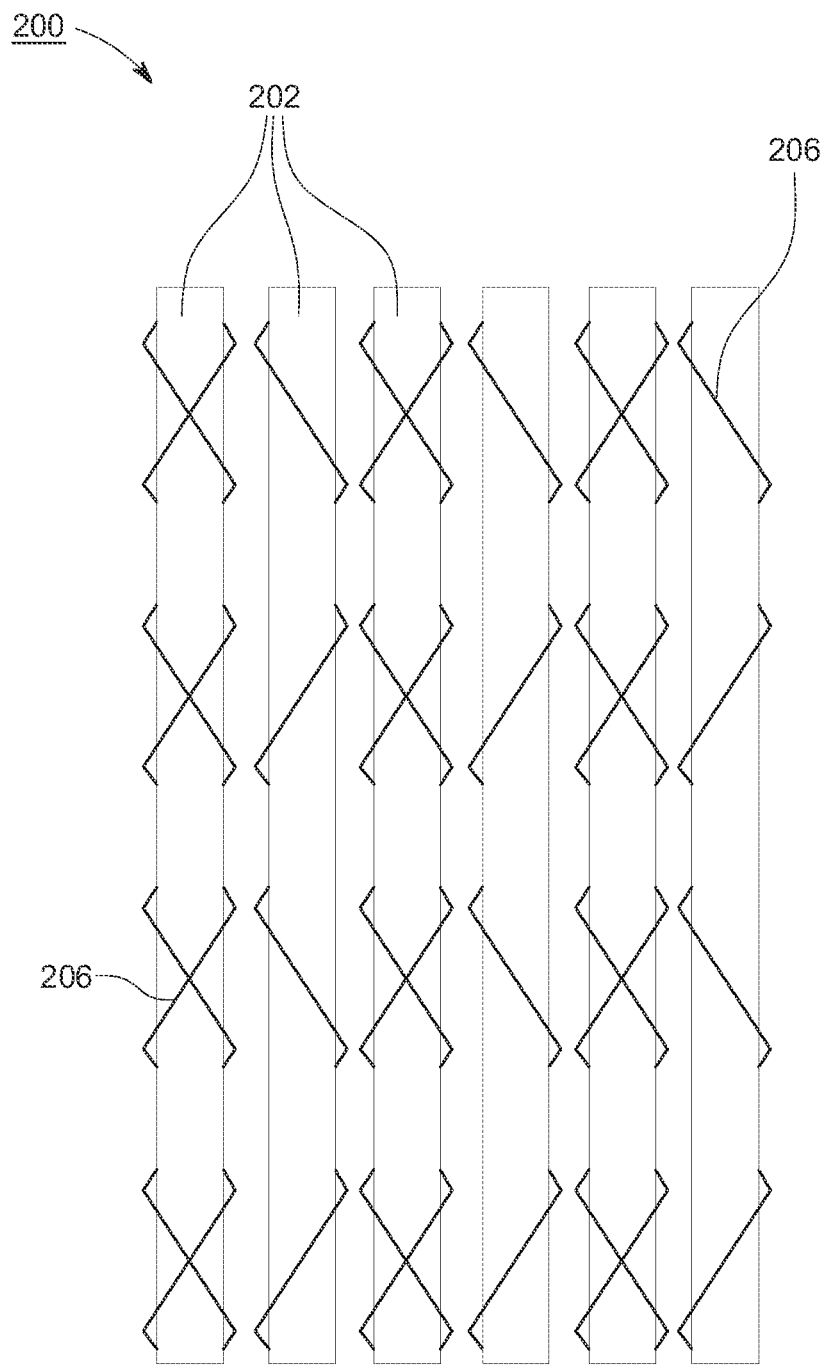

Any stitching pattern suitable to hold the fibers 102, 104 of the fabric 100 together can be used. Various exemplary stitching patterns 200 are shown in FIGS. 2A-2C. A tricot stitching pattern 200 in which reinforcing fibers 202 (e.g., the fibers 102, 104) are held together by a stitching yarn 206 (e.g., the stitching yarn 106) is shown in FIG. 2A. An asymmetric double tricot stitching pattern 200 in which the reinforcing fibers 202 (e.g., the fibers 102, 104) are held together by the stitching yarn 206 (e.g., the stitching yarn 106) is shown in FIG. 2B. An asymmetric diamant (diamond-like) stitching pattern 200 in which the reinforcing fibers 202 (e.g., the fibers 102, 104) are held together by the stitching yarn 206 (e.g., the stitching yarn 106) is shown in FIG. 2C. The general inventive concepts may encompass other stitching patterns as well. FIGS. 1C-1D illustrate a tricot stitching pattern used in the fabric 100.

In general, the stitching pattern 200 is a repeating series of stitches, with transitions between each individual stich portion 220 defining a stitching length 222 (see FIG. 2A). The stitching length 222 is another variable that can influence the rate of infusion of the fabric 100. Typically, the stitching length 222 will be within the range of 3 mm to 6 mm. In some exemplary embodiments, the stitching length 222 is 4 mm. In some exemplary embodiments, the stitching length 222 is 5 mm.

The hybrid reinforcement fabric 100 is a unidirectional fabric, wherein between 91 wt. % to 99 wt. % of the reinforcing fibers 102, 104 are oriented in a first direction and 0.5 wt. % to 9 wt. % of the reinforcing fibers 102, 104 are oriented in one or more other directions (e.g., second and third directions).

Typically, the first direction will be 0° (lengthwise direction of the fabric).

The second direction is different from the first direction. The second direction will generally be between greater than 0° and less than or equal to 90°.

The third direction is different from the first direction. The third direction will generally be greater than 0° and less than or equal to 90°.

The third direction may be the same as the second direction (such that there are only two distinct fiber orientations in the fabric). Otherwise, the third direction will typically be equal to the negative orientation of the second direction.

In the hybrid reinforcement fabric 100 shown in FIGS. 1A-1D, the first direction is 0°, the second direction is 80°, and the third direction is −80°.

In some exemplary embodiments, all of the reinforcing fibers oriented in the second direction are glass reinforcing fibers 102.

In some exemplary embodiments, all of the reinforcing fibers oriented in the third direction are glass reinforcing fibers 102.

In some exemplary embodiments, the glass reinforcing fibers 102 oriented in the first direction include a different glass composition than the glass reinforcing fibers 102 oriented in the second direction.

In some exemplary embodiments, the glass reinforcing fibers 102 oriented in the first direction include a different glass composition than the glass reinforcing fibers 102 oriented in the third direction.

In some exemplary embodiments, the glass reinforcing fibers 102 oriented in the second direction include the same glass composition as the glass reinforcing fibers 102 oriented in the third direction.

The hybrid reinforcement fabric 100 comprises between 65 wt. % to 95 wt. % of glass reinforcing fibers 102 and between 5 wt. % to 35 wt. % of carbon reinforcing fibers 104. The stitching yarn 106 comprises a maximum of 3 wt. % of the fabric 100.

The linear mass density of the glass reinforcing fibers 102 being fed in the first direction is between 1,200 Tex and 4,800 Tex. The linear mass density of the glass reinforcing fibers 102 being fed in the non-first direction (i.e., the second/third directions) is between 68 Tex and 300 Tex.

The tow size of the carbon reinforcing fibers 104 being fed in the first direction is between 6K and 50K. The nomenclature #k means that the carbon tow is made up of #x 1,000 individual carbon filaments.

The areal weight of the carbon reinforcing fibers 104 in the fabric 100 is between 80 g/m$^2$ to 500 g/m$^2$. In some exemplary embodiments, the hybrid reinforcement fabric 100 has approximately 7 wt. % of carbon reinforcing fibers 104, with the fabric 100 having an areal weight of approximately 2,500 g/m$^2$. In some exemplary embodiments, the hybrid reinforcement fabric 100 has approximately 15 wt. % of carbon reinforcing fibers 104, with the fabric 100 having an areal weight of approximately 1,300 g/m$^2$. In some exemplary embodiments, the hybrid reinforcement fabric 100 has approximately 15 wt. % of carbon reinforcing fibers 104, with the fabric 100 having an areal weight of approximately 1,400 g/m$^2$. In some exemplary embodiments, the hybrid reinforcement fabric 100 has approximately 25 wt. % of carbon reinforcing fibers 104, with the fabric 100 having an areal weight of approximately 1,300 g/m$^2$.

As known in the art, the glass reinforcing fibers 102 may have a chemistry applied thereon during formation of the fibers 102. This surface chemistry, typically in an aqueous form, is called a sizing. The sizing can include components such as a film former, lubricant, coupling agent (to promote compatibility between the glass fibers and the polymer resin), etc. that facilitate formation of the glass fibers and/or use thereof in a matrix resin. In some exemplary embodiments, the glass reinforcing fibers 102 include a polyester compatible sizing. In some exemplary embodiments, the glass reinforcing fibers 102 include an epoxy compatible sizing.

Likewise, as also known in the art, the carbon reinforcing fibers 104 may have a chemistry applied thereon during formation of the fibers 104. This surface chemistry, typically in an aqueous form, is called a sizing. The sizing can include components such as a film former, lubricant, coupling agent (to promote compatibility between the carbon fibers and the polymer resin), etc. that facilitate formation of the carbon fibers and/or use thereof in a matrix resin. In some exemplary embodiments, the carbon reinforcing fibers 104 include a polyester compatible sizing. In some exemplary embodiments, the carbon reinforcing fibers 104 include an epoxy compatible sizing.

In some exemplary embodiments, the glass reinforcing fibers 102 and/or the carbon reinforcing fibers 104 may also have a post-coating applied thereto. Unlike a sizing, the post-coating is applied after formation of the fibers.

The hybrid reinforcing fabrics disclosed herein (e.g., the hybrid reinforcement fabric 100) have combinations of structural components and/or properties that improve the resin infusion rate of the fabrics, even when the reinforcing fibers making up the fabric are not pre-impregnated with resin. As noted above, these components/properties include the glass content, the carbon content, the glass-carbon ratio, the stitching yarn composition, the stitching pattern, and the stitching length used in the hybrid reinforcing fabrics.

Figure 3:
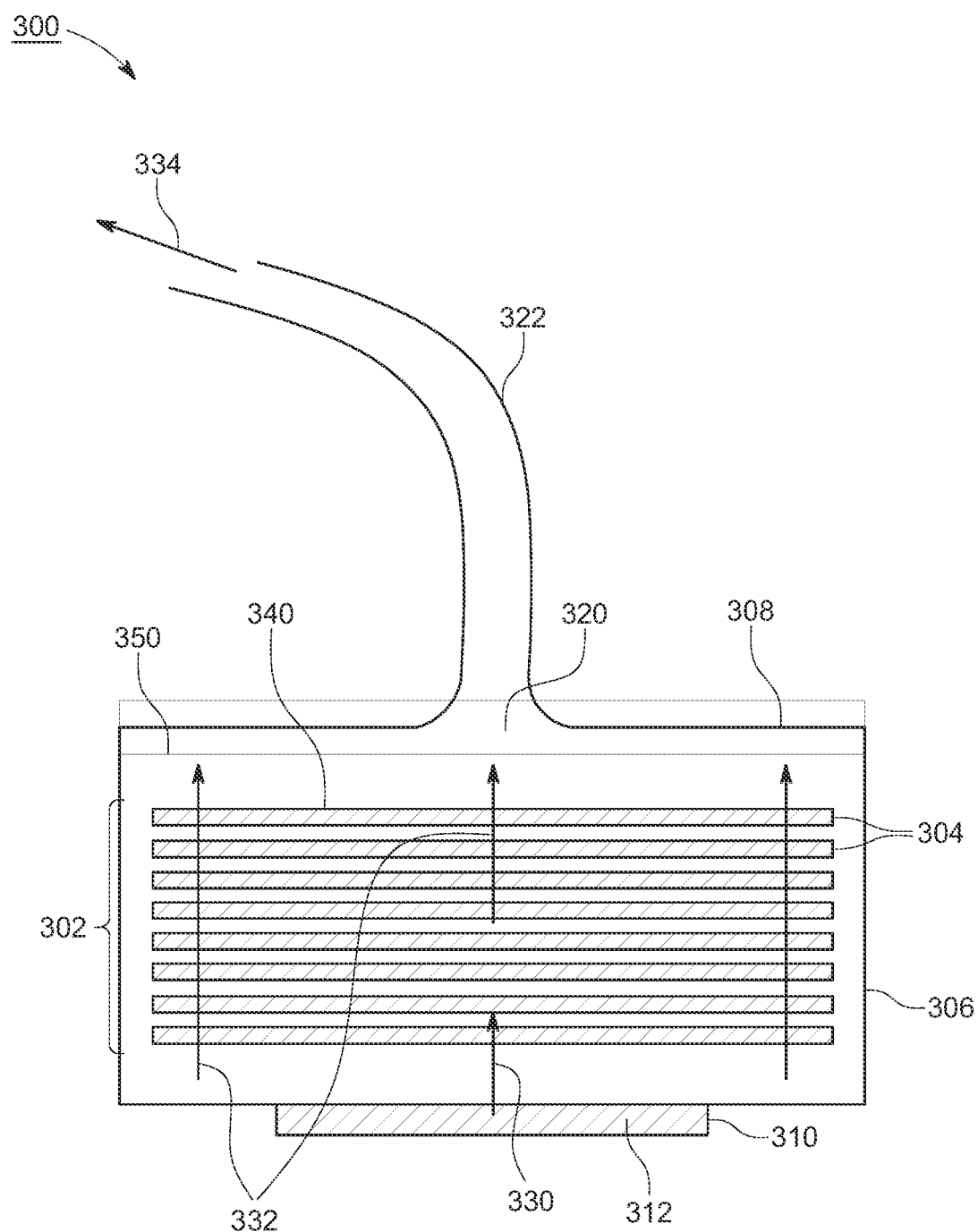
FIG. 3 is a diagram illustrating a through thickness infusion speed (TTIS) test for measuring the infusion rate of a fabric.

One test for the measuring the resin infusion rate of a fabric is called the through thickness infusion speed (TTIS) test. The TTIS test will be explained with reference to FIG. 3. In the TTIS test 300, multiple layers 302 of a fabric 304 to be tested (e.g., the hybrid reinforcement fabric 100) are placed on an infusion table 306. In general, many layers 302 of the fabric 304 are used for the TTIS test 300. Typically, the number of layers 302 is based on a target "testing thickness." In some exemplary embodiments, the target thickness is 30 mm. A vacuum foil 308 is placed over the layers 302 on top of the table 306 to form an airtight enclosure 350 (i.e., vacuum bag).

A supply 310 of resin 312 is situated below, or otherwise in proximity to, the table 306, such that the resin 312 can be drawn into the enclosure 350 (e.g., through one or more openings (not shown) in the bottom of the table 306) below the layers 302 of the fabric 304. In some exemplary embodiments, the resin 312 is located remote from the table 306, but is fed thereto through a supply hose (not shown). An opening 320 in the vacuum bag formed from the foil 308 is interfaced with a hose 322 so that a vacuum source (not shown) can be used to evacuate air from the enclosure 350 and suck the resin 312 through the fabric 304.

In this manner, the resin 312 is pulled from the supply 310 into the enclosure 350 (see arrow 330); through the layers 302 of the fabric 304 (see arrows 332); and out the opening 320 through the hose 322 (see arrow 334). Given the close-fitting dimensions of the layers 302 of the fabric 304 within the enclosure 350, the only path for the resin 312 to travel is through the layers 302 of the fabric 304, i.e., through the thicknesses (z-direction) of the layers 302 of the fabric 304. The TTIS test 300 measures the amount of time it takes until the resin 312 is first visible on an upper surface 340 of a top layer 302 of the fabric 304. This amount of time (e.g., in minutes) is used as a measure of the rate of infusion of the fabric 304. The TTIS test 300 can be used to compare the rates of infusion of different fabrics, so long as the other testing parameters are substantially the same. Additionally, for comparison purposes, the fabrics should have similar grammage.

Figure 4A:
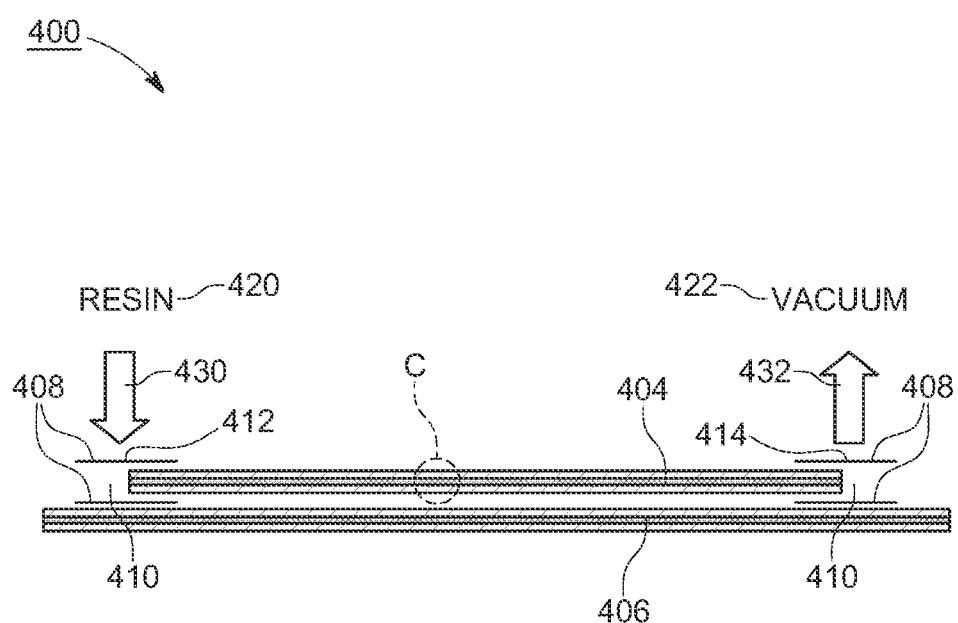
FIGS. 4A-4B illustrate an in-plane infusion test (IPIT) test for measuring the infusion rate of a fabric.
Figure 4B:
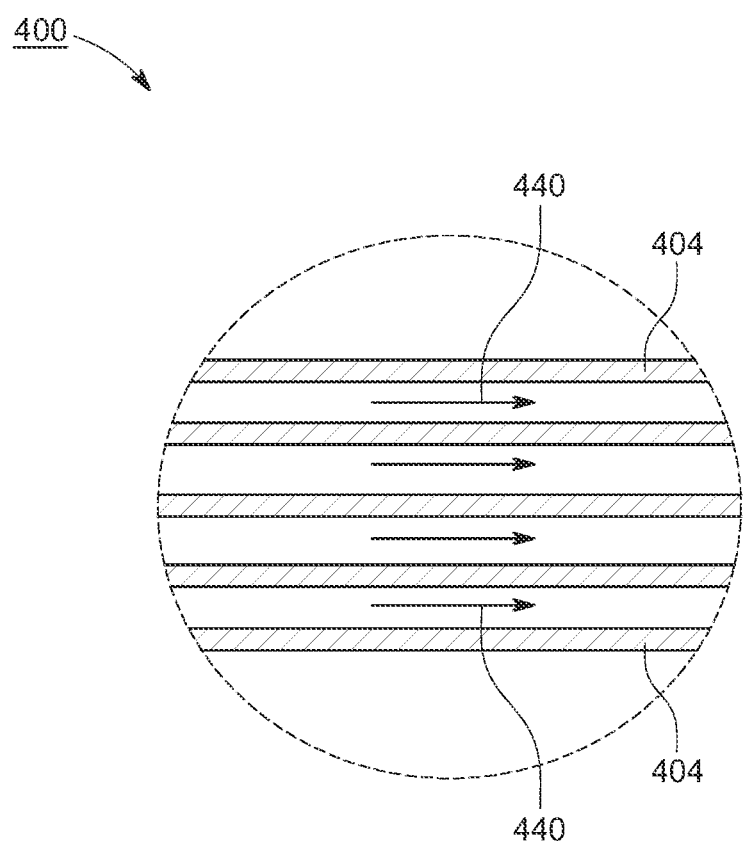

Another test for the measuring the resin infusion rate of a fabric is called the in-plane infusion test (IPIT) test. The IPIT test will be explained with reference to FIGS. 4A-4B. In the IPIT test 400, five (5) layers of a fabric 404 to be tested (e.g., the hybrid reinforcement fabric 100) are placed on an infusion table 406. A vacuum foil 408 is placed over the edges of the layers on top of the table 406, and sealed to the table 406 (e.g., using tape), to form an airtight enclosure 410 (i.e., vacuum bag).

All of the layers of the fabric 404 in the enclosure 410 are aligned with one another so as to face in the same direction (e.g., the first orientation of each layer of the fabric 404 aligns with the first orientation of each other layer of the fabric 404) within the enclosure 410.

The vacuum foil 408 (and tape) form the airtight enclosure 410 except for an input opening 412 and an output opening 414 formed near opposite ends of the fabric 404.

A supply of resin 420 is situated adjacent to, or otherwise in proximity to, the input opening 412. As configured, the resin 420 can be drawn into the enclosure 410 through the input opening 412. In some exemplary embodiments, the resin 420 is located remote from the table 406, but is fed thereto through a supply hose (not shown) interfaced with the input opening 412. The output opening 414, on the other side of the enclosure 410, is interfaced with a hose (not shown) so that a vacuum source 422 can be used to evacuate air from the enclosure 410 and suck the resin 420 through the fabric 404.

In this manner, the resin 420 is pulled from the supply into the enclosure 410 (see arrow 430); through the layers of the fabric 404 (see arrows 440 in FIG. 4B); and out the opening 414 through the hose (see arrow 432). Given the close-fitting dimensions of the layers of the fabric 404 within the enclosure 410, the only path for the resin 420 to travel is through the layers of the fabric 404, i.e., through the length (x-direction, production direction) or width (y-direction) of the layers of the fabric 404, depending on the orientation of the fabric 404 between the openings 412, 414 of the enclosure 410. Thus, only the resin channels within the layers of the fabric 404 are used to transport the resin 420.

The IPIT test 400 measures the distance covered by the resin 420 over time. A flow front (distance) of the resin 420 is recorded after 2, 4, 6, 8, 10, 12, 16, 20, 26, 32, 38, 44, 50, 55, and 60 minutes. The current distance that the resin 420 has traveled through the fabric 404 is referred to as the infusion length. The measured amount of time (e.g., in minutes) relative to the infusion length (e.g., in centimeters) is used as a measure of the rate of infusion of the fabric 404. The IPIT test 400 can be used to compare the rates of infusion of different fabrics, so long as the other testing parameters are substantially the same. Additionally, for comparison purposes, the fabrics should have similar warp grammage.

EXAMPLES

Two (2) different fabrics were assessed using the IPIT test 400 to measure the infusion rate in both the x-direction and the y-direction. The first fabric contained only glass reinforcing fibers (i.e., no carbon reinforcing fibers), and served as the reference fabric. The second fabric contained 15% carbon reinforcing fibers (and, thus, 85% glass reinforcing fibers), and was produced according to the general inventive concepts. The measurements for the first fabric (UD 1200) are provided in Table 1. The measurements for the inventive hybrid fabric (15% carbon content) are provided in Table 2.

TABLE 1

| Time (min.) | Length (Y) (cm) | Length (X) (cm) |
| --- | --- | --- |
| 2 | 6.5 | 9.5 |
| 4 | 7.4 | 11.0 |
| 6 | 8.2 | 12.3 |
| 8 | 8.7 | 13.3 |
| 10 | 9.1 | 14.1 |
| 12 | 9.4 | 14.6 |
| 16 | 10.1 | 15.6 |
| 20 | 10.7 | 16.5 |
| 26 | 11.4 | 17.7 |
| 32 | 12.2 | 18.9 |
| 38 | 12.9 | 19.9 |
| 44 | 13.5 | 20.8 |
| 50 | 13.9 | 21.7 |
| 55 | 14.2 | 22.3 |
| 60 | 14.7 | 22.8 |

TABLE 2

| Time (min.) | Length (Y) (cm) | Length (X) (cm) |
| --- | --- | --- |
| 2 | 8.1 | 11.5 |
| 4 | 9.0 | 13.8 |
| 6 | 9.9 | 15.4 |
| 8 | 10.7 | 16.9 |
| 10 | 11.5 | 18.1 |
| 12 | 11.9 | 19.1 |
| 16 | 12.6 | 20.7 |
| 20 | 13.1 | 22.1 |
| 26 | 14.4 | 23.9 |
| 32 | 15.2 | 25.8 |
| 38 | 16.0 | 27.3 |
| 44 | 16.8 | 28.8 |
| 50 | 17.4 | 30.2 |
| 55 | 18.0 | 31.4 |
| 60 | 18.5 | 32.4 |

Figure 5:
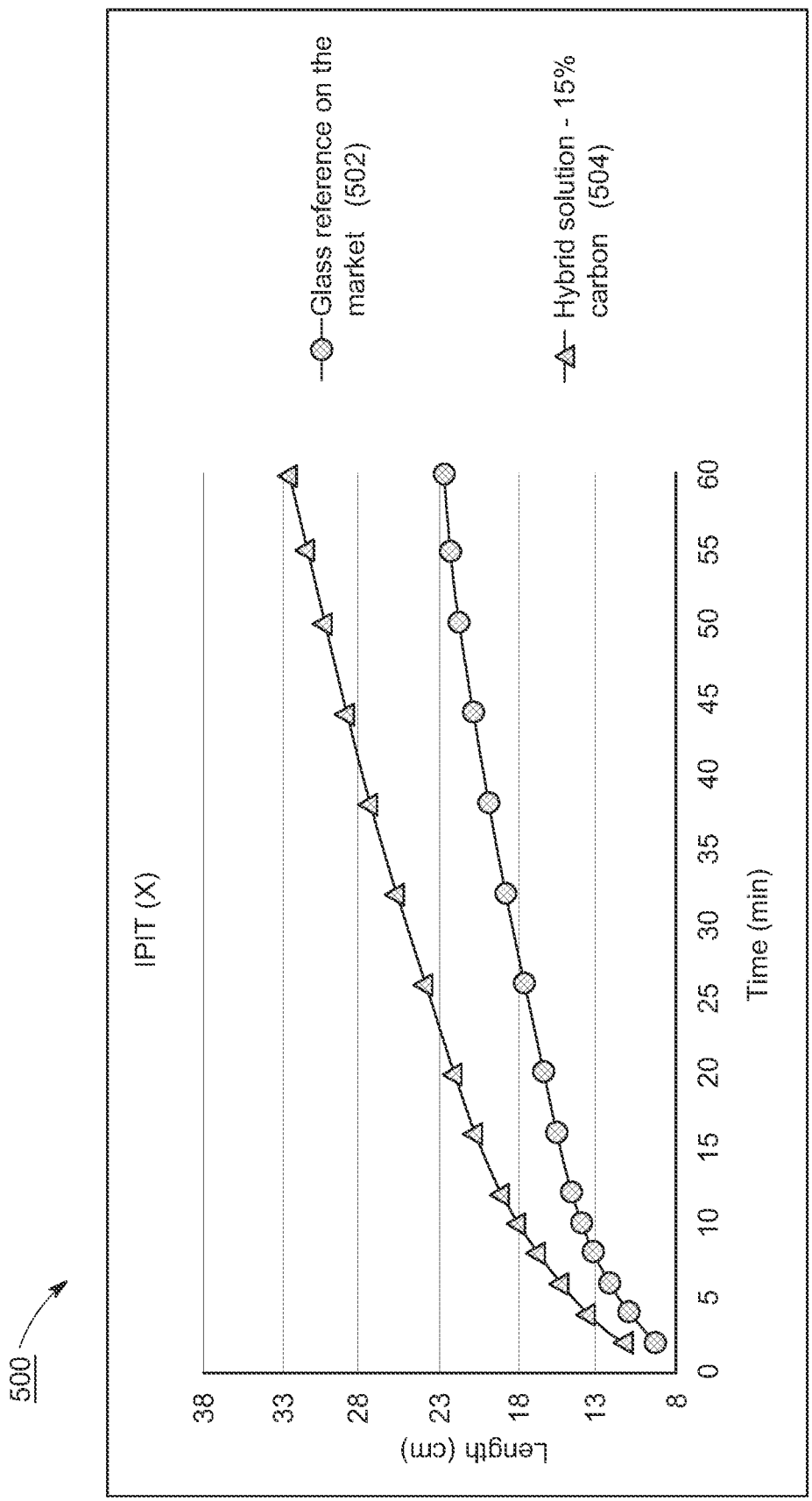
FIG. 5 is a graph illustrating the results of the IPIT test of FIG. 4 performed on two (2) different fabrics to measure the infusion rate (in the x-direction) of the fabrics.

FIG. 5 is a graph 500 that shows the results of the IPIT test 400 performed on two (2) different fabrics to measure the infusion rate (in the x-direction) of the fabrics. A first fabric 502 is made up of 100% glass reinforcing fibers (i.e., no carbon reinforcing fibers), uses a polyester stitching yarn, uses a stitching yarn of 110 dTex, and uses a stitching length of 5 mm. A second fabric 504 is made up of 85% glass reinforcing fibers and 15% carbon reinforcing fibers, uses a polyester stitching yarn, uses a stitching yarn of 220 dTex, and uses a stitching length of 4 mm. The first fabric 502 corresponds to the fabric detailed in Table 1 above, while the second fabric 504 corresponds to the fabric detailed in Table 2 above.

Figure 6:
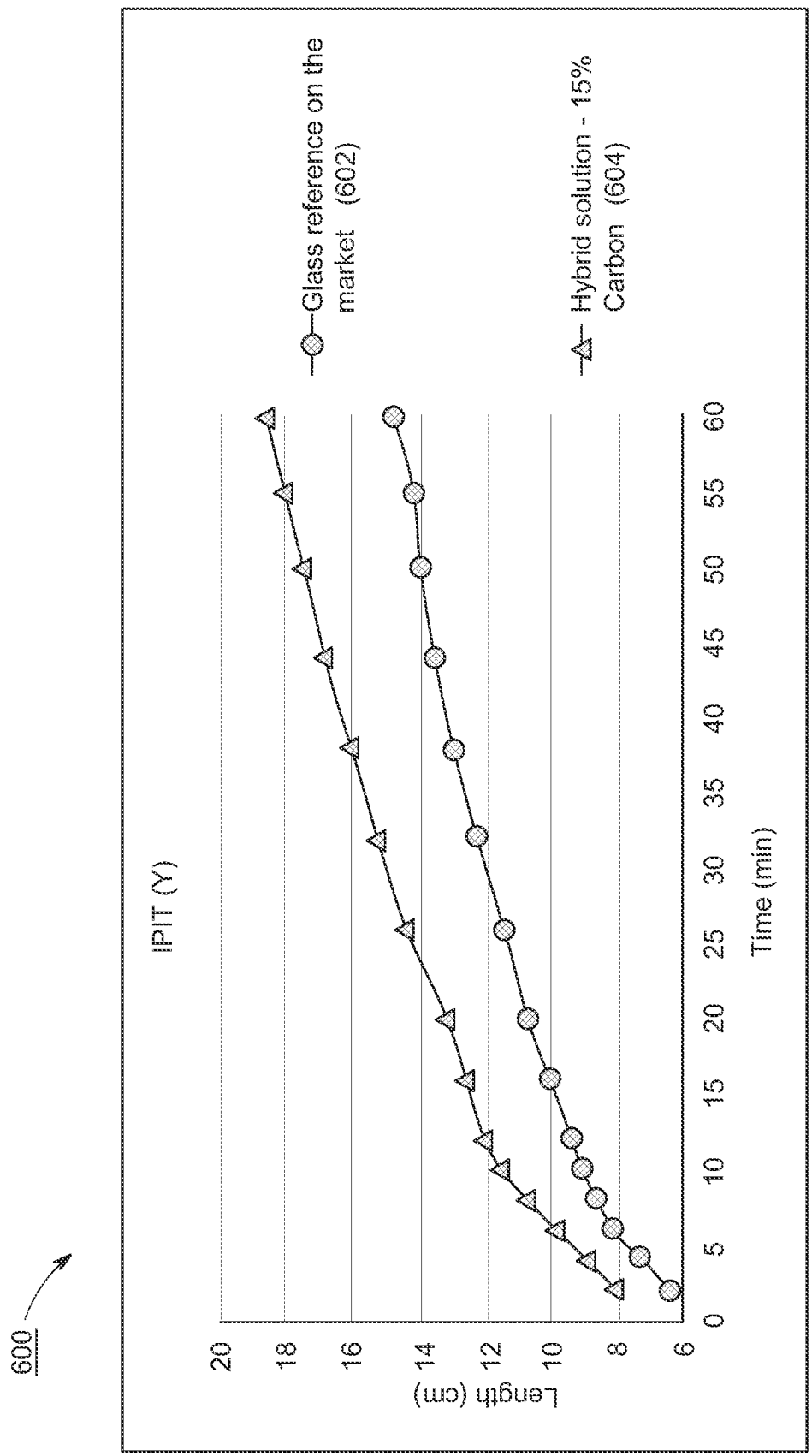
FIG. 6 is a graph illustrating the results of the IPIT test of FIG. 4 performed on two (2) different fabrics to measure the infusion rate (in the y-direction) of the fabrics.

FIG. 6 is a graph 600 illustrating the results of the IPIT test 400 performed on two (2) different fabrics to measure the infusion rate (in the y-direction) of the fabrics. A first fabric 602 is made up of 100% glass reinforcing fibers (i.e., no carbon reinforcing fibers), uses a polyester stitching yarn, uses a stitching yarn of 110 dTex, and uses a stitching length of 5 mm. A second fabric 604 is made up of 85% glass reinforcing fibers and 15% carbon reinforcing fibers, uses a polyester stitching yarn, uses a stitching yarn of 220 dTex, and uses a stitching length of 4 mm. The first fabric 602 corresponds to the fabric detailed in Table 1 above, while the second fabric 604 corresponds to the fabric detailed in Table 2 above.

The hybrid reinforcing fabrics described herein (e.g., the hybrid reinforcement fabric 100) can be combined with a resin matrix, such as in a mold, to form a composite article. Any suitable resin system can be used. In some exemplary embodiments, the resin is a vinyl ester resin. In some exemplary embodiments, the resin is a polyester resin. In some exemplary embodiments, the resin is an epoxy resin. In some exemplary embodiments, the resin includes a viscosity modifier.

The infusion rate of various resin systems through different embodiments of a hybrid reinforcing fabric (e.g., differing carbon contents) are shown in Table 3 below.

TABLE 3

| | Resin | 7% Carbon | 15% Carbon | 25% Carbon |
| --- | --- | --- | --- | --- |
| infusion rate through a thickness of the fabric (approximately 30 mm) | epoxy | 8 min (0.419 cm/min) | 16 min (0.23 cm/min) | 16 min |
| | polyester | | 9 min (0.41 cm/min) | |
| infusion rate through the fabric in the first direction | epoxy | 32 cm in 60 min (0.6 cm/min) | 32 cm in 60 min (0.6 cm/min) | 30 cm in 60 min (0.5 cm/min) |
| | polyester | | 44 cm in 60 min (0.73 cm/min) | |
| infusion rate through the fabric in the second direction | epoxy | 20 cm in 60 min (0.33 cm/min) | 18 cm in 60 min (0.3 cm/min) | |
| | polyester | | 16 cm in 60 min (0.27 cm/min) | |

Any suitable composite forming process can be used, such as vacuum-assisted resin transfer molding (VARTM). The composite article is reinforced by the hybrid reinforcing fabric. In some exemplary embodiments, the composite article is a wind turbine blade or related component (e.g., spar cap). The hybrid reinforcing fabrics disclosed and suggested herein may achieve improved mechanical properties (versus a comparable glass-only fabric). For example, a hybrid reinforcing fabric (having a 15% carbon content) can exhibit a modulus improvement of approximately 30% and a fatigue improvement between 40% and 50%, as compared to a similar glass-only fabric (e.g., having the same grammage, such as 1,323 g/m$^2$).

The above description of specific embodiments has been given by way of example. From the disclosure given, those skilled in the art will not only understand the inventive concepts and their attendant advantages, but will also find apparent various changes and modifications to the structures and concepts disclosed. It is sought, therefore, to cover all such changes and modifications as fall within the spirit and scope of the general inventive concepts, as defined herein and by the appended claims, and equivalents thereof.

What is claimed is:
1. A hybrid reinforcing fabric comprising:
   a plurality of first fibers oriented in a first direction;
   a plurality of second fibers oriented in the first direction;
   a plurality of third fibers oriented in a second direction; and
   a stitching yarn maintaining the first fibers, the second fibers, and the third fibers in their respective orientations,
   wherein the first fibers are one of glass fibers and carbon fibers,
   wherein the second fibers are carbon fibers, wherein the third fibers are at least one of glass fibers and carbon fibers,
wherein the first direction is 0 degrees,
wherein the second direction is greater than 0 degrees and less than or equal to 90 degrees,
wherein the first fibers and the second fibers constitute between 91 wt. % and 99.5 wt. % of the fabric,
wherein the third fibers constitute between 0.5 wt. % and 9 wt. % of the fabric,
wherein the glass fibers constitute between 3 wt. % to 95 wt. % of the fabric,
wherein the carbon fibers constitute between 5 wt. % to 97 wt. % of the fabric,
wherein a linear mass density of the first fibers is in the range of 1,200 Tex to 4,800 Tex,
wherein an areal weight of the second fibers is in the range of 80 g/m$^2$ to 500 g/m$^2$,
wherein the stitching yarn is a polyester yarn,
wherein the stitching yarn defines a stitching length in the range of 3 mm to 6 mm, and
wherein the stitching yarn has a linear mass density in the range of 85 dTex to 250 dTex.

2. The hybrid reinforcing fabric of claim 1, wherein the stitching yarn constitutes less than 3 wt. % of the fabric.

3. The hybrid reinforcing fabric of claim 1, wherein the stitching yarn forms a stitching pattern through the fabric, the stitching pattern being selected from the group consisting of a tricot stitching pattern, a symmetric double tricot stitching pattern, an asymmetric double tricot stitching pattern, a symmetric diamant stitching pattern, and an asymmetric diamant stitching pattern.

4. The hybrid reinforcing fabric of claim 1, wherein the third fibers are glass fibers, and
wherein a glass composition of the first fibers differs from a glass composition of the third fibers.

5. The hybrid reinforcing fabric of claim 1, further comprising a plurality of fourth fibers oriented in a third direction,
wherein the third fibers are glass fibers and the fourth fibers are glass fibers, and
wherein a glass composition of the third fibers is the same as a glass composition of the fourth fibers.

6. The hybrid reinforcing fabric of claim 5, wherein an absolute value of the second direction is equal to an absolute value of the third direction.

7. The hybrid reinforcing fabric of claim 1, wherein a difference between the first direction and the second direction is greater than or equal to 45 degrees.

8. The hybrid reinforcing fabric of claim 1, wherein a difference between the first direction and the second direction is greater than or equal to 80 degrees.

9. The hybrid reinforcing fabric of claim 1, wherein the third fibers are glass fibers, and
wherein a linear mass density of the third fibers is in the range of 68 Tex to 300 Tex.

10. The hybrid reinforcing fabric of claim 1, wherein the second fibers are fed from one or more carbon tows having a size in the range of 6K to 50K.

11. The hybrid reinforcing fabric of claim 1, wherein the second fibers constitute 7 wt. % of the fabric, and
wherein an areal weight of the fabric is 2,500 g/m$^2$.

12. The hybrid reinforcing fabric of claim 1, wherein the second fibers constitute 15 wt. % of the fabric, and
wherein an areal weight of the fabric is 1,300 g/m$^2$.

13. The hybrid reinforcing fabric of claim 1, wherein the second fibers constitute 15 wt. % of the fabric, and
wherein an areal weight of the fabric is 1,400 g/m$^2$.

14. The hybrid reinforcing fabric of claim 1, wherein the second fibers constitute 25 wt. % of the fabric, and
wherein an areal weight of the fabric is 1,300 g/m$^2$.

15. The hybrid reinforcing fabric of claim 1, wherein the fabric contains no resin pre-impregnated therein.

16. The hybrid reinforcing fabric of claim 1, wherein the fabric is infused with a resin that is cured to form a composite article.

17. The hybrid reinforcing fabric of claim 16, wherein the article is a wind turbine blade.

* * * * *